(12) United States Patent
van Niekerk

(10) Patent No.: US 8,549,840 B2
(45) Date of Patent: Oct. 8, 2013

(54) FLUID INJECTOR

(75) Inventor: Hermanus van Niekerk, Fullerton, CA (US)

(73) Assignee: Cummins Cal Pacific, LLC, Irvine, CA (US)

( * ) Notice: Subject to any disclaimer, the term of this patent is extended or adjusted under 35 U.S.C. 154(b) by 517 days.

(21) Appl. No.: 12/944,994

(22) Filed: Nov. 12, 2010

(65) Prior Publication Data

US 2012/0121475 A1 May 17, 2012

(51) Int. Cl.
*F01N 3/00* (2006.01)
*B05B 15/00* (2006.01)

(52) U.S. Cl.
USPC .......................................... 60/286; 239/132.3

(58) Field of Classification Search
USPC .......................................... 60/286; 239/132.3
See application file for complete search history.

(56) References Cited

U.S. PATENT DOCUMENTS

| | | | |
|---|---|---|---|
| 5,605,042 A | 2/1997 | Stutzenberger | |
| 5,692,684 A * | 12/1997 | Zurmuhlen | ................ 239/563 |
| 5,924,280 A | 7/1999 | Tarabulski | |
| 5,976,475 A | 11/1999 | Peter-Hoblyn et al. | |
| 6,063,350 A | 5/2000 | Tarabulski et al. | |
| 6,257,496 B1 | 7/2001 | Wyant | |
| 6,279,603 B1 | 8/2001 | Czarnik et al. | |
| 6,449,947 B1 | 9/2002 | Liu et al. | |
| 6,539,708 B1 | 4/2003 | Hofmann et al. | |
| 7,100,366 B2 | 9/2006 | Hager et al. | |
| 7,252,243 B2 | 8/2007 | Bjorn et al. | |
| 7,383,794 B2 * | 6/2008 | Hlousek et al. | ............ 123/41.33 |
| 7,467,749 B2 | 12/2008 | Tarabulski et al. | |
| 7,744,017 B2 | 6/2010 | Cooke | |
| 2007/0228191 A1 | 10/2007 | Harmon et al. | |
| 2008/0006723 A1 * | 1/2008 | Hlousek et al. | ............ 239/533.2 |

(Continued)

FOREIGN PATENT DOCUMENTS

DE 10 2010 039 052 A1 2/2012
DE 10 2010 039 084 A1 2/2012

OTHER PUBLICATIONS

Communication from European Patent Application No. 12305416.5, dated Sep. 9, 2012.

*Primary Examiner* — Thomas Denion
*Assistant Examiner* — Jason Shanske
(74) *Attorney, Agent, or Firm* — Alston & Bird LLP

(57) ABSTRACT

The invention provides a fluid injector assembly for the injection of a fluid including an injector body having distal and proximal ends, a fluid inlet disposed towards the proximal end, a fluid outlet disposed towards the distal end, and a fluid pathway extending therebetween the inlet and the outlet. An injector needle is rotatably disposed at least partially in the injector body and is moveable between an open and closed position. The proximal end of the injector needle has a tip that is configured to sealably close the fluid outlet. The fluid injector assembly includes a first threaded region that cooperates with a corresponding threaded region on the needle, and first and second cooperating coupling members that are arranged axially of the injector needle. The first coupling member is attached to a motor, and the second coupling member is attached to a distal end of the injector needle. The motor is configured to rotate the injector needle within the injector body which causes the threaded region of the needle to be driven in the first threaded region of the fluid injector assembly to thereby move the injector needle along a longitudinal axis of the fluid injector assembly between the open and closed positions.

17 Claims, 11 Drawing Sheets

(56) References Cited

U.S. PATENT DOCUMENTS

| | | |
|---|---|---|
| 2008/0011777 A1 | 1/2008 | Cooke |
| 2008/0078166 A1 | 4/2008 | Rose et al. |
| 2008/0087739 A1 | 4/2008 | Tarabulski et al. |
| 2008/0209897 A1 | 9/2008 | Urven et al. |
| 2009/0301067 A1 | 12/2009 | Dingle et al. |
| 2010/0090034 A1 | 4/2010 | Stretch |
| 2010/0186392 A1 | 7/2010 | Cartwright et al. |
| 2010/0212303 A1 | 8/2010 | Jaulmes et al. |

* cited by examiner

FLUID INJECTOR

FIELD OF THE INVENTION

The present invention relates generally to devices for injecting fluids, and more particularly to a fluid injector for injecting urea into an exhaust gas stream.

BACKGROUND OF THE INVENTION

Exhaust emissions from internal combustion engines are a significant contributor to pollution in the environment. In particular, nitric oxide (NOx) emissions contribute to smog and acid rain. NOx, which includes both nitrogen oxide and nitrogen dioxide, is a byproduct of the combustion of fossil fuels, and diesel engines are regarded as a major generator of NOx.

To reduce the levels of NOx emitted into the atmosphere, the exhaust systems of internal combustion engines include catalytic converters that convert NOx into water and nitrogen. Catalytic converters in diesel engines do not work as well in reducing NOx in comparison to standard engines. This is due in part because diesel engines run cooler than standard engines, and the converters work better at higher temperatures. To address this shortcoming, the exhaust systems of diesel engines include a system for the Selective Catalytic Reduction (SCR) of NOx in which a urea solution is injected in the exhaust stream upstream of the catalytic converter. After injection into the exhaust stream, the urea solution evaporates and mixes with the exhaust stream. The urea decomposes and hydrolyzes into ammonia. NOx reacts with the thus generated ammonia in the presence of the catalyst and is catalytically reduced.

Many typical SCR systems utilize an injection nozzle that is solenoid or spring activated. Such injection nozzles typically only move between a single open and closed position and do not allow for precise control over the amount of urea that is injected into the exhaust stream. As a result, an insufficient amount of urea solution to neutralize the NOx in the exhaust stream may be introduced into the exhaust stream. To ensure that the NOx is fully neutralized, some systems inject a surplus of the urea solution into the exhaust stream, which may also be undesirable. Additionally, many urea injection systems use compressed air to assist in the injection and atomization process. The air acts as the delivery system and at the same time cleans out the delivery lines from unwanted urea thus mitigating any crystallization and clogging issues.

Accordingly, there still exists a need for a fluid injector having improved control over the amount of urea solution discharged from the injector, and the ability to shut off the flow and prevent clogging of the injector due to crystallization.

BRIEF SUMMARY OF THE INVENTION

Embodiments of the present invention provide a fluid injector assembly for the injection of a fluid. In one embodiment, the invention provides a fluid injector assembly comprising an injector body having a distal end and a proximal end, a fluid inlet disposed towards the proximal end of the injector body, a fluid outlet disposed towards the distal end of the injector body, and a fluid pathway extending between the inlet and the outlet. An injector needle is rotatably disposed at least partially in the injector body and is moveable between an open and closed position. The proximal end of the injector needle has a tip that is configured to sealably close the fluid outlet of the injector body. The fluid injector assembly includes a first threaded region that cooperates with a corresponding threaded region on the needle, and first and second cooperating coupling members that are arranged axially of the injector needle. The first coupling member is attached to a motor, and the second coupling member is attached to a distal end of the injector needle. The motor is configured to rotate the injector needle within the injector body which causes the threaded region of the injector to be driven in the first threaded region of the fluid injector assembly to thereby move the injector needle along a longitudinal axis of the fluid injector assembly between the open and closed positions.

At least one of the coupling members includes at least one connecting member that is slidingly inserted into a corresponding cavity on the other coupling member. Rotation of the first coupling member by the motor also rotates the second coupling member and the injector needle. Rotation of the injector needle causes the threaded region of the injector needle to be threaded through the first threaded region, which causes the injector needle to be rotably driven in a linear direction. Driving of the injector needle causes the at least one connecting member to slide in or out of the corresponding cavity so that the injector needle is moveable between the opened and closed positions.

In one embodiment of the present invention, the first threaded region is disposed in a collar that is disposed adjacent to a distal end of the injector body. In a preferred embodiment, the collar is disposed between the distal end of the injector body and the pair of coupling members. Preferably, rotational movement of the collar is fixed relative to the rotation of the injection needle. In an alternative embodiment, the first threaded region can be configured and arranged in a different portion of the fluid injector assembly, such as in a portion of the injector body.

In one embodiment, the fluid passageway is formed by an annular space that exists between the injector needle and an inner surface wall of the injector body. When in use, an injection fluid to be injected can be introduced into the fluid passageway via the fluid inlet. The fluid then flows through the fluid passageway to the injector outlet from which it can be discharged from the injector body.

In one alternative embodiment, the first and second coupling members each have a plurality of connecting members and a plurality of cavities that each correspond to an individual corresponding connecting member on the opposite coupling member. In a preferred embodiment, the first and second coupling members each include three connecting members and three corresponding cavities.

In a further embodiment, the fluid injector assembly of the present invention is particularly useful in an exhaust emissions system for the reduction of nitric oxide (NOx). In particular, the fluid injector assembly can be positioned within an exhaust gas stream upstream of a selective catalytic reduction (SCR) catalyst. In this embodiment, the fluid injector assembly can be used to introduce a stream of aqueous urea into an exhaust stream flow. While in the injector body, or shortly after being discharged therefrom, the urea stream is subjected to conditions (e.g., heat) that cause the urea to decompose into steam and ammonia. The resulting ammonia is discharged into the exhaust stream where it mixes with the exhaust stream and is carried downstream to the catalyst where the ammonia and NOx react in the catalyst to convert the NOx to nitrogen gas and water. The resulting clean flow is then discharged from an outlet disposed downstream of the catalyst.

The exhaust emissions system may also include a particulate filter that is disposed upstream or downstream of the urea injection nozzle. The particulate filter assists in the removal of particulate matter from the exhaust stream like soot, soluble organic fraction (SOF), and other pollutants produced by engine.

Aspects of the invention are also directed to the use of one or more heating elements that are disposed upstream of the urea injection. The heating element(s) assist in the heating of the exhaust stream prior to the urea injection. Generally, urea injection and catalyst performance is improved at temperatures above about 450° F. In addition, an exhaust stream temperature greater than about 450° F. is generally desirable for the decomposition of urea into ammonia. In the present invention, the presence of the heating element upstream of the urea injection helps to ensure that the urea injection and catalyst operates most efficiently and that the temperature within the exhaust stream is sufficient to decompose the urea into ammonia.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
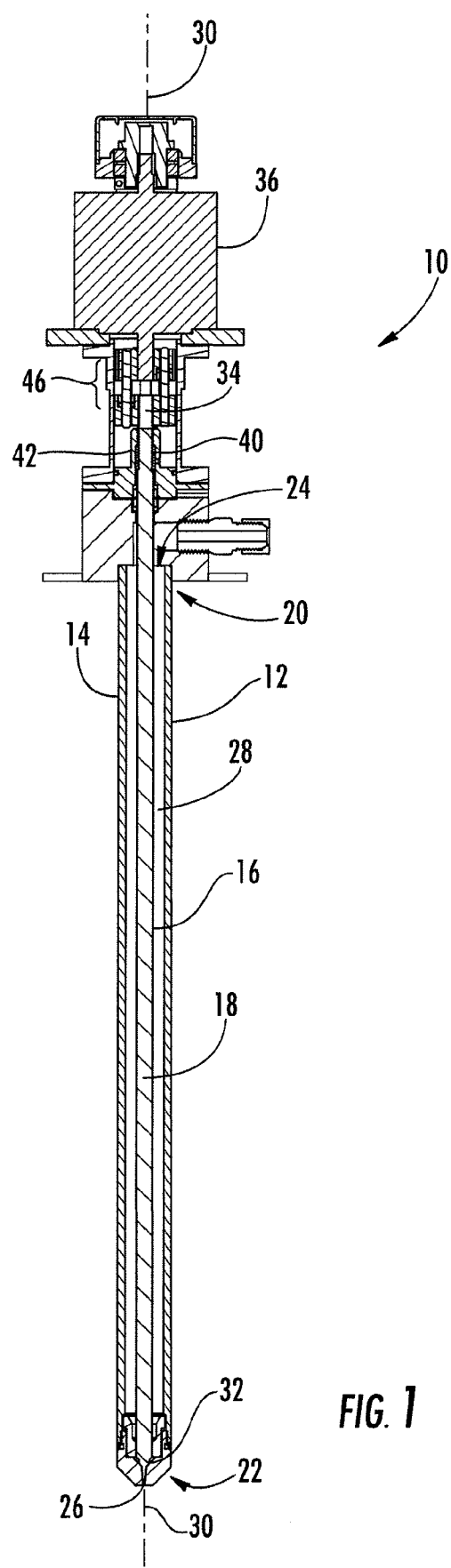
FIG. 1 is a cross-sectional view of an fluid injector assembly in accordance with one embodiment of the present invention.

With reference to FIG. 1, a fluid injector assembly in accordance with an embodiment of the invention is illustrated and designated by reference number 10. The fluid injector assembly 10 includes a first portion 12 having a longitudinally extending injector body 14 and a second portion 16 including an injector needle 18. The injector body 14 includes a distal end 20 and a proximal end 22. A fluid inlet 24 is disposed towards a distal end 20 of the injector body and a fluid outlet 26 is disposed towards the proximal end 22 of the injector body. A fluid passageway 28 extends from the fluid inlet to the fluid outlet along a longitudinal axis 30 of the fluid injector assembly 10. When in use, a fluid to be injected by the fluid injector assembly is introduced into the fluid passageway via the fluid inlet. The fluid then flows through the fluid passageway to the injector outlet from which it can be discharged from the injector body. The fluid may be any fluid or gas appropriate for the particular application, including but not limited to, ammonia, fuel, water, or urea, or such as may be used in a selective catalytic reduction (SCR) catalyst system, for example.

In a preferred embodiment, the fluid passageway 28 is formed by a longitudinally extending annular space that exists between the injector needle 18 and an inner surface of the injector body.

The injector needle 18 is at least partially disposed in the injector body 14 and is configured and arranged to move between an opened and closed position. The injector needle includes a proximal end 32 having a tip that is configured and arranged to sealably close the fluid outlet, and a distal end 34 that is in mechanical communication with a motor 36. As discussed in greater detail below, the first portion 12 of the fluid injector assembly includes a first threaded region 40 that cooperates with a corresponding threaded region 42 on the injector needle. Preferably, the position of the first threaded region is fixed relative to the movement of the injector needle. The motor is configured to rotate the injector needle within the injector body which causes the threaded region of the injector needle to be driven in the first threaded region of the fluid injector assembly to thereby linearly move the injector needle 18 along the longitudinal axis 30 between the open and closed positions.

Figure 5:
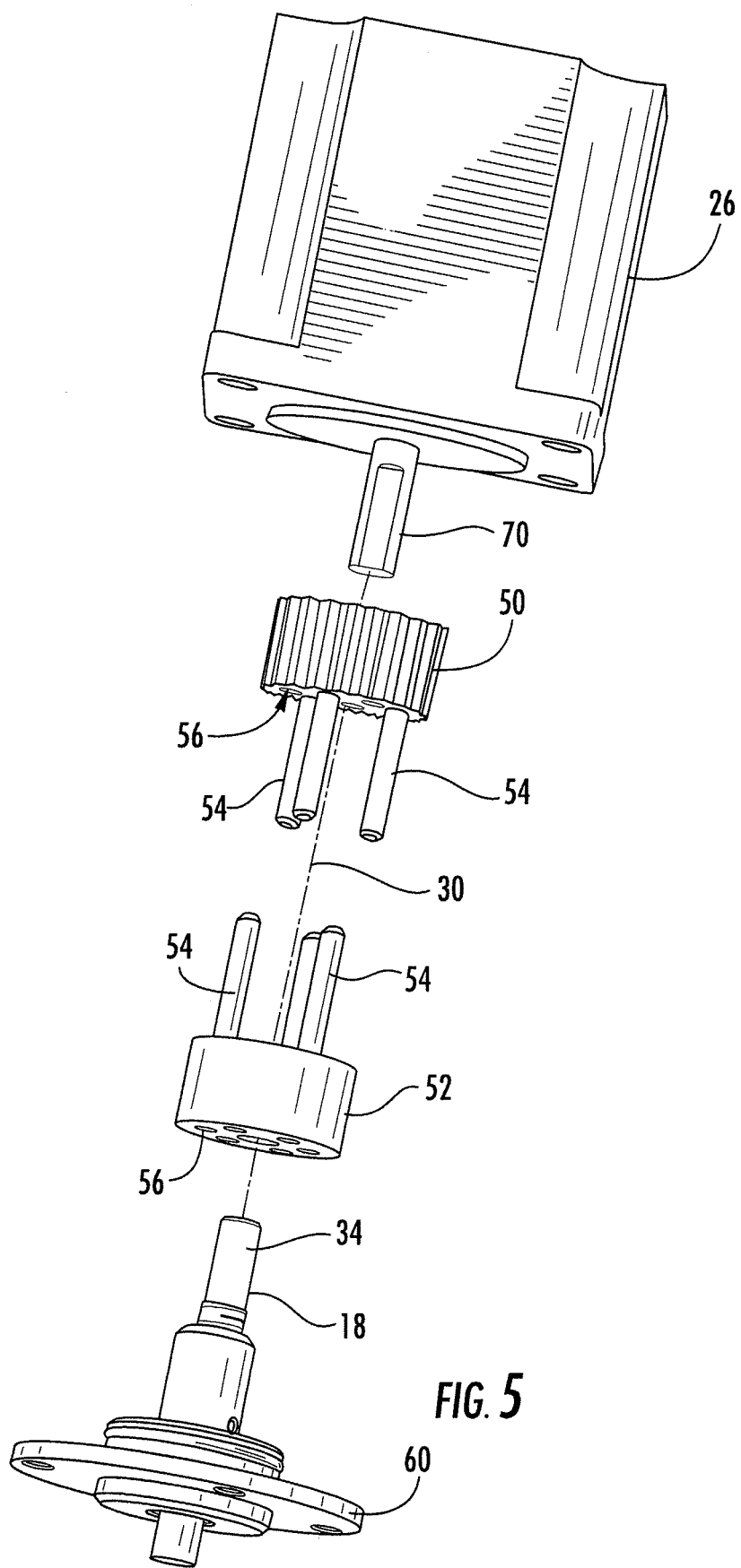

The distal end of the injector needle is in mechanical communication with the motor 36 via a pair of cooperating coupling members 46 that are arranged axially of the injector needle 18. As can best be seen in FIGS. 2-5, the pair of coupling members 46 includes a first coupling member 50 that is rotatably attached to the motor 36 and a second coupling member 52 that is attached to the first coupling member and to the distal end 34 of the injector needle 18. Typically, the first coupling member 50 is rotatably fixed or secured to the motor 36 via a motor shaft (See FIG. 5, reference number 70) so that rotation of the motor will also rotate pair of coupling members. The first and second coupling members 50, 52 are moveably interconnected to each other by at least one connecting member 54 that is slidingly inserted into a corresponding cavity 56 on the opposite coupling member. The second coupling member 52 is linearly moveable along the longitudinal axis 30 relative to first coupling member 50. That is, the second coupling member can move along the longitudinal axis of the fluid injector assembly while the position of the first coupling member relative to the longitudinal axis is fixed.

The first coupling member 50 can be attached to the motor shaft with a suitable fastening device, such as a set screw, that prevents linear movement of the first coupling member 50. The injector needle 18 can be attached to the second coupling member 52 with suitable fastening devices, such as set screws, pins, bolts, and the like. In a preferred embodiment, a pair of set screws attach the second coupling member to the injector needle.

In the illustrated embodiment, the first and second coupling members each have a plurality of connecting members 54 and a plurality of cavities 56 that each correspond to a corresponding connecting member on the opposite coupling member. However, it should be recognized that the pair of connecting members can be interconnected via a single connecting member and a single corresponding cavity. For example, in the embodiment illustrated in FIGS. 4-5 the first and second coupling members each include three connecting members and three corresponding cavities. In an alternative embodiment, one of the coupling members can have a single annular shaped connecting member that is configured to be slidingly inserted into an annular shaped cavity on the opposite coupling member.

Figure 2:
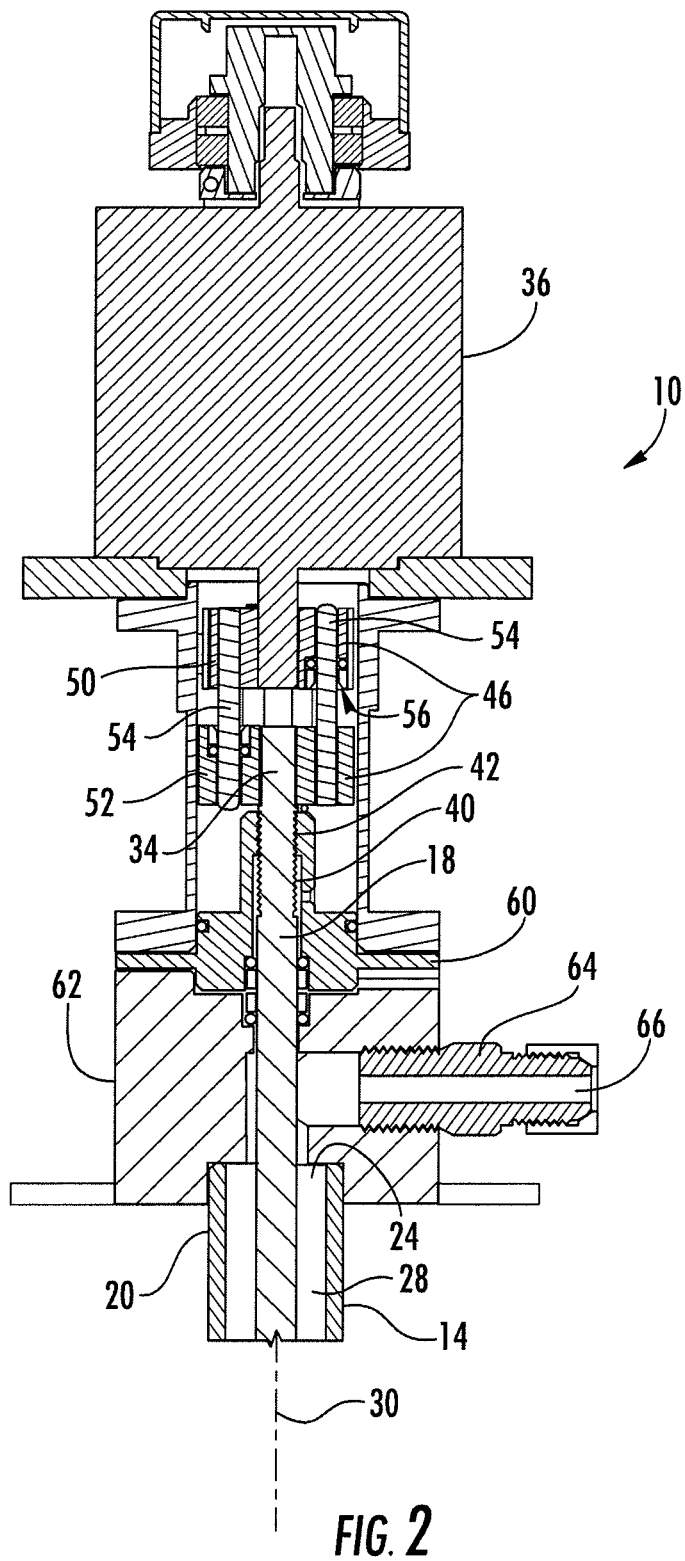
FIGS. 2 and 3 are cross-sectional side views of a distal portion of the fluid injector assembly depicted in FIG. 1.
Figure 3:
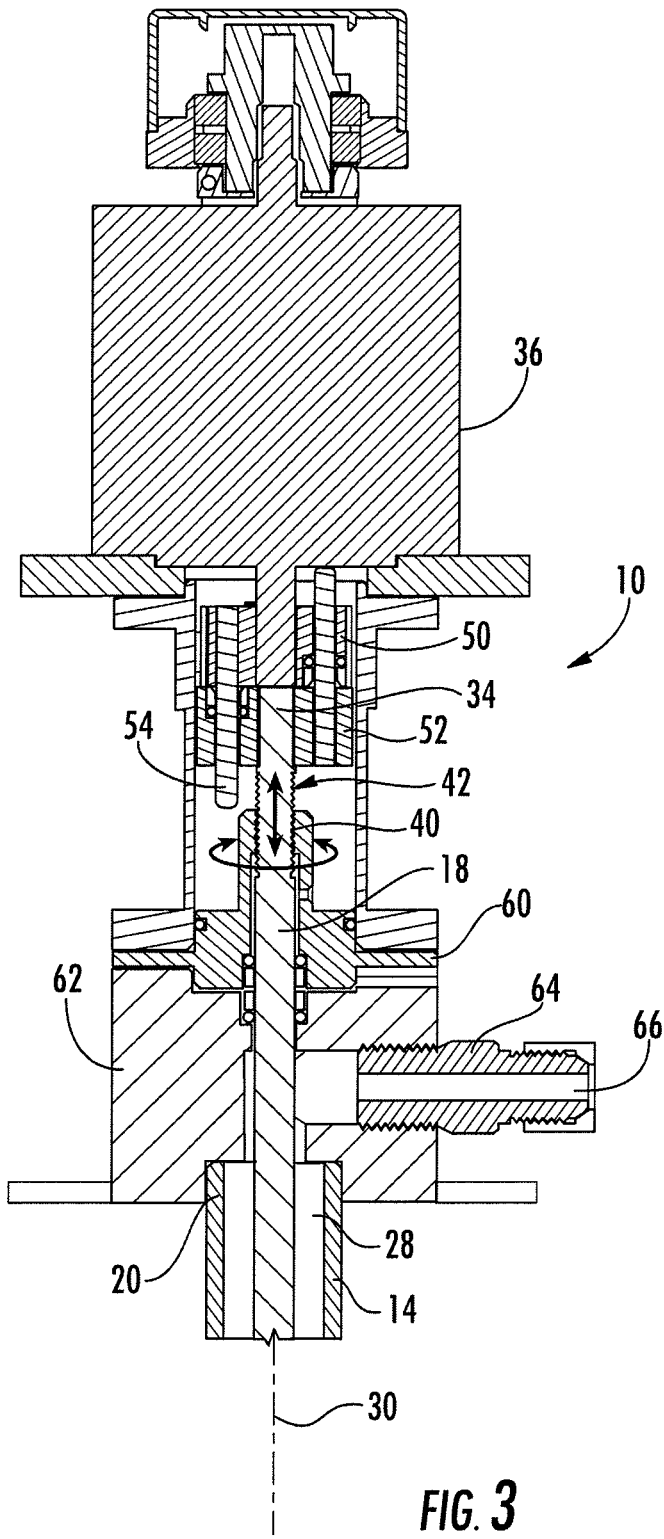
Figure 4:
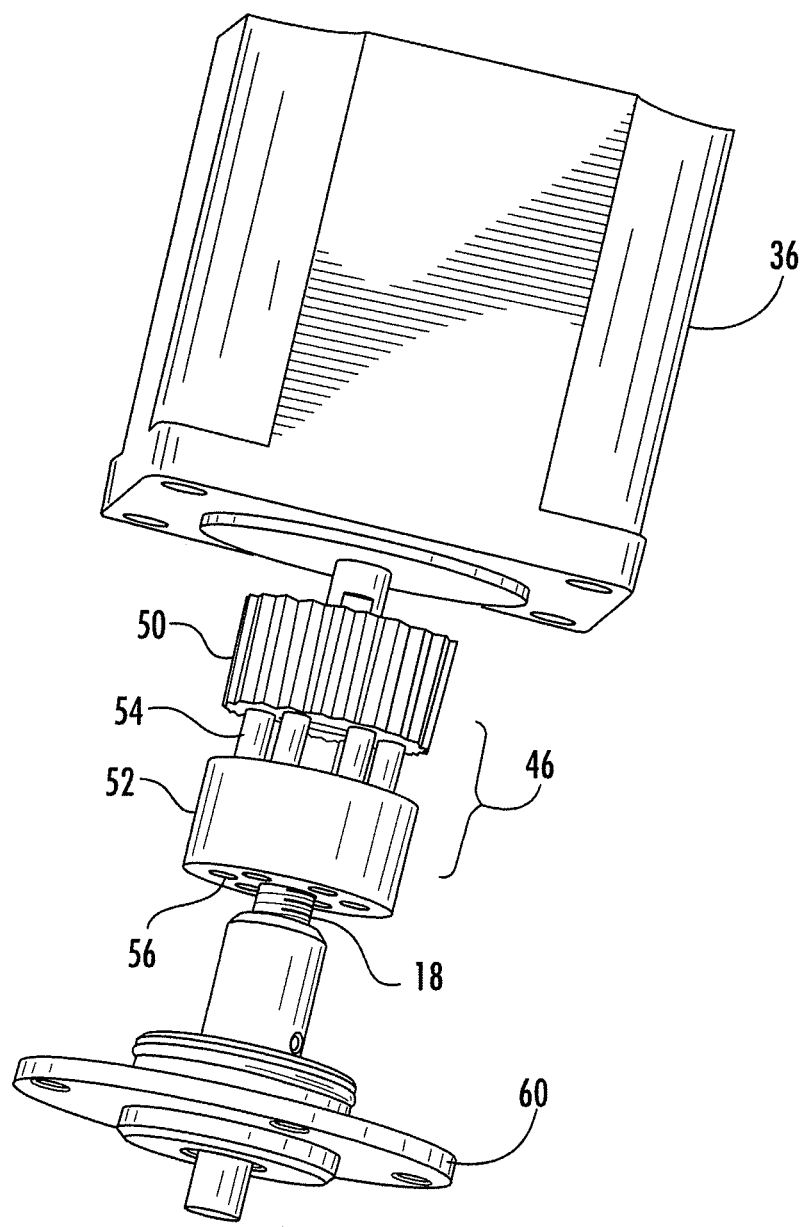
FIGS. 4 and 5 show the coupling members of the fluid injector assembly depicted in FIG. 1.

As shown in FIGS. 2 and 3, the first threaded region 40 is inter-threaded with the corresponding threaded region 42 on the injector needle 18. In one embodiment of the present invention, the first threaded region 40 is disposed in a collar 60 that is attached to a mounting block 62 of the first portion of the needle injector assembly 10. As shown, the mounting block 62 is attached to the injector body. Preferably, the movement of the collar 60 is fixed relative to the rotation of the injection needle 18. Alternatively, the first threaded region 40 can be configured and arranged in a different portion of the injector needle assembly, such as in a portion of the injector body 14.

As briefly noted above, first and second cooperating coupling members 50, 52 are arranged axially of the injector needle 18. Rotation of the first coupling member 50 by the motor 36 also rotates the second coupling member 52 and the injector needle 18. This in turn causes the threaded region 42 of the injector needle 18 to be threaded through the first threaded region 40 so that the needle is rotably driven in the longitudinal direction of the injector needle assembly (i.e., so that the injector needle is driven towards or away from the injector outlet). Driving of the injector needle in the first threaded region also causes the distal end of the injector needle to move towards or away from the motor. In response to this movement, the at least one connecting member 54 of the pair of coupling members is configured to slide in or out of the corresponding cavity 56 on the opposite coupling member. In this way, rotational driving of the needle through the first threaded region also moves the second coupling member longitudinally along with the injector needle.

In one embodiment, the position of the injector needle within the injector body can be monitored and controlled so that a desired level of fluid is discharged from the fluid injector assembly. For example, a sensor, such as position feedback sensor, can be used to monitor the position of the injector needle relative to the injector body. The position feedback sensor can send signals to an electronic control unit (ECU) that can then instruct the motor to adjust the position of the injector needle accordingly.

The inventors have discovered that the fluid injector assembly of the present invention may help to provide improved control over the injection process and also may help improve control over the amount of fluid discharged from the fluid injector assembly. In particular, movement of the injector needle can be controlled to provide a desired level of fluid injected from the fluid injector assembly. In one embodiment, the motor can be instructed to move the injector needle into a fully closed position at any time, and thereby act as a clean-out drive for any contamination that may have accumulated near the proximal end of the injector body. Advantageously, the design and configuration of the fluid injector assembly has been selected to deliver near linear flow characteristics as a function of rotational motion over a wide range of operating conditions. Embodiments of the fluid injector assembly have linear flow characteristics that are capable of yielding flow operating ranges of 10:1, which is particularly use in the control of diesel engines.

In one embodiment, fluid is introduced into the fluid passageway 28 through a fluid fitment 64 in the mounting block 62. The fluid fitment and the mounting block include a flow passageway 66 that is in fluid communication with the fluid inlet of the injector body.

Figure 6A:
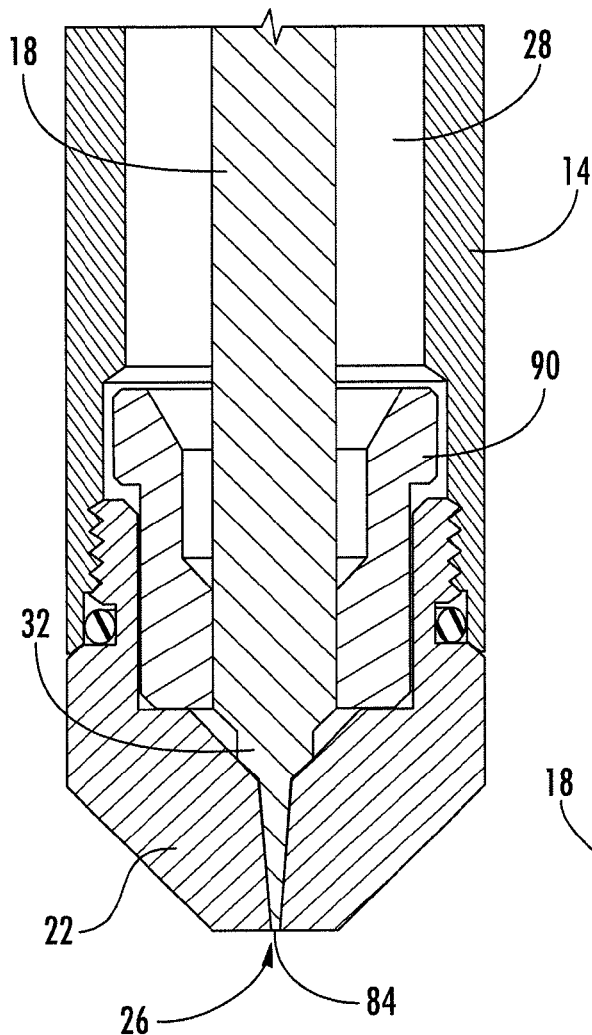
FIGS. 6A and 6B are cross-sectional side views of a proximal portion of the fluid injector assembly depicted in FIG. 1.
Figure 6B:
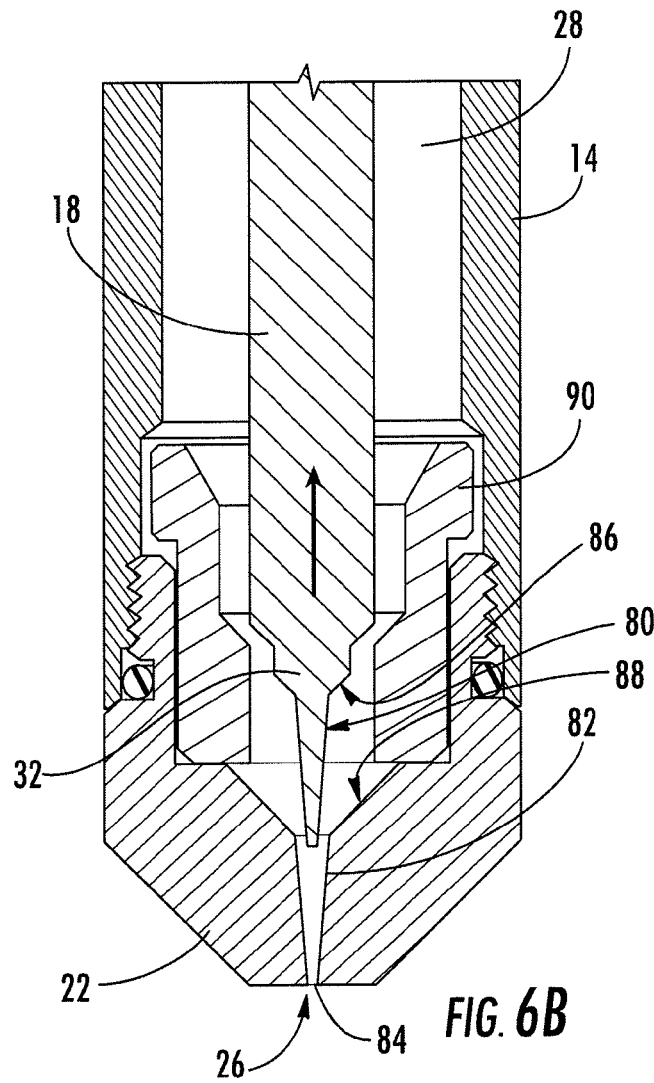

Referring to FIGS. 6A and 6B, a portion of the proximal end of the injector needle assembly is illustrated. In FIG. 6A, the injector needle 18 is shown in a closed position, and in FIG. 6B, the injector needle 18 is shown in an open position. The proximal end 22 of the injector body includes an opening 84 defining fluid outlet 26. As shown, the proximal end of the injector needle 18 includes a conically-shaped surface 80 that cooperates with a corresponding conically-shaped surface 82 at the proximal end 22 of the injector body. Conically-shape surface 82 defines a needle flow path that cooperates with the corresponding surface 80 on the injector needle to create the desired flow characteristics. In a preferred embodiment, the injector needle 18 includes a second conically-shaped surface 86 and the injector body includes a second corresponding conically-shaped surface 88 to sealably close the fluid outlet when the injector needle is moved into a closed position.

In one embodiment, the proximal end 22 of the injector body 14 also includes a needle centering fitment 90 to help align the tip of the injector needle 18 with the fluid outlet 26. In the illustrated embodiment, the needle centering fitment is shown as a separate piece that is removably secured to the proximal end of the injector body. In other embodiments, the needle centering fitment can be an integral portion of the injector body. For example, the needle centering fitment can be machined as part of the injector body.

As shown in FIG. 6B, the fluid outlet can be opened by moving the injector needle 18 so that the tip of the needle is not seated on surfaces 82, 88 so that fluid can be discharged from the fluid outlet. In the illustrated embodiment, the shaft of the injector needle is shown in an open position where the fluid can flow between the tip of the injector needle and needle centering fitment. Alternatively, the needle centering fitment can include one or more capillaries or openings that permit the flow of the fluid from fluid passageway 28 to the proximal portion of the injector body.

Figure 7:
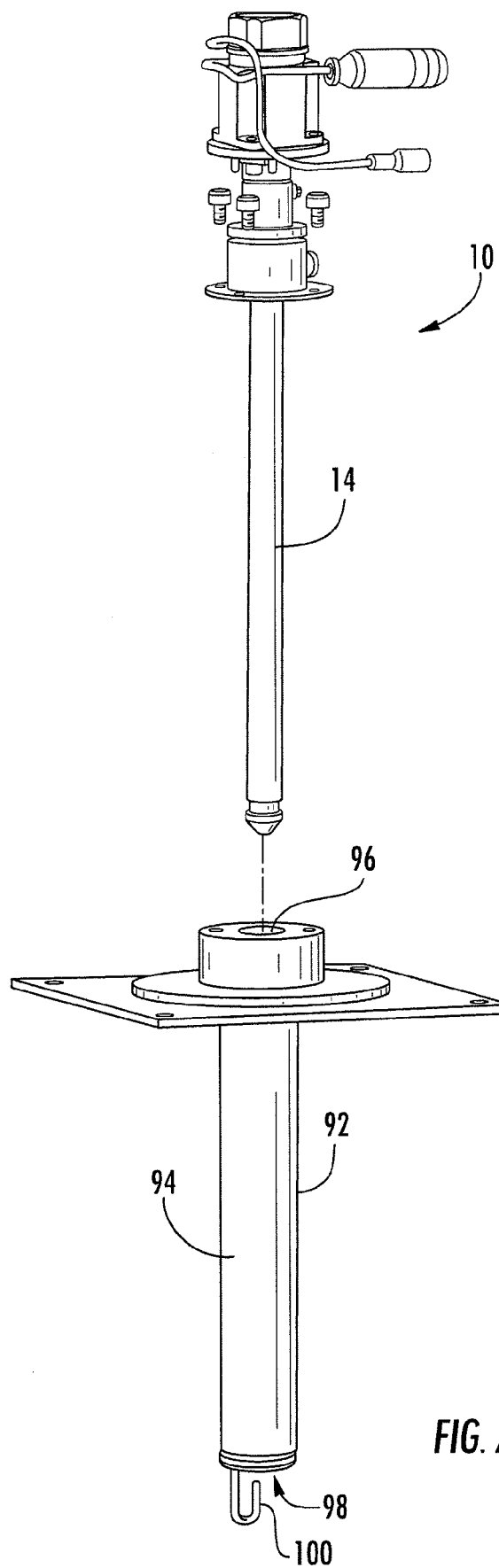
FIG. 7 depicts the fluid injector assembly of FIG. 1 in conjunction with a cooling jacket.

FIG. 7 illustrates an embodiment of the fluid injector assembly 10 that includes a cooling jacket 92 that helps to control the temperature of the fluid within the injector needle assembly at a desired temperature. The cooling jacket comprises an inner (not visible) and outer wall 94 defining an annular shaped internal cavity through which a cooling fluid is circulated to maintain the fluid to be injected by the fluid injector assembly within a desired temperature range. In one embodiment, the cooling jacket also includes an interior cavity (not visible) into which the fluid injector assembly can be removably inserted through opening 96, and an opposite opening 98 from which fluid is discharged from the proximal end of the fluid injector assembly 10.

In some embodiments, the fluid injector assembly 10 may include an impact surface 100 (e.g. a plate) positioned directly opposite the fluid outlet so that the spray of fluid injected by the fluid injector assembly 10 will impact the surface and become rapidly, finely dispersed.

In one advantageous embodiment, the fluid to be injected can also serve as the cooling fluid that is circulated in the cooling jacket. For example, the fluid injector assembly 10 and the cooling jacket can both be in fluid communication with the same fluid source. In one such embodiment, fluid provided from a fluid source is split into first and second fluid streams. The first stream is introduced into the cooling jacket where it is circulated and eventually returned to the fluid source (e.g., a tank or reservoir). The second fluid stream is introduced into the fluid passageway of the injector body via the fluid fitment (See briefly, FIG. 2, reference number 64). In some embodiments, it may be desirable to filter the fluid prior to being introduced into the fluid passageway.

Figure 8:
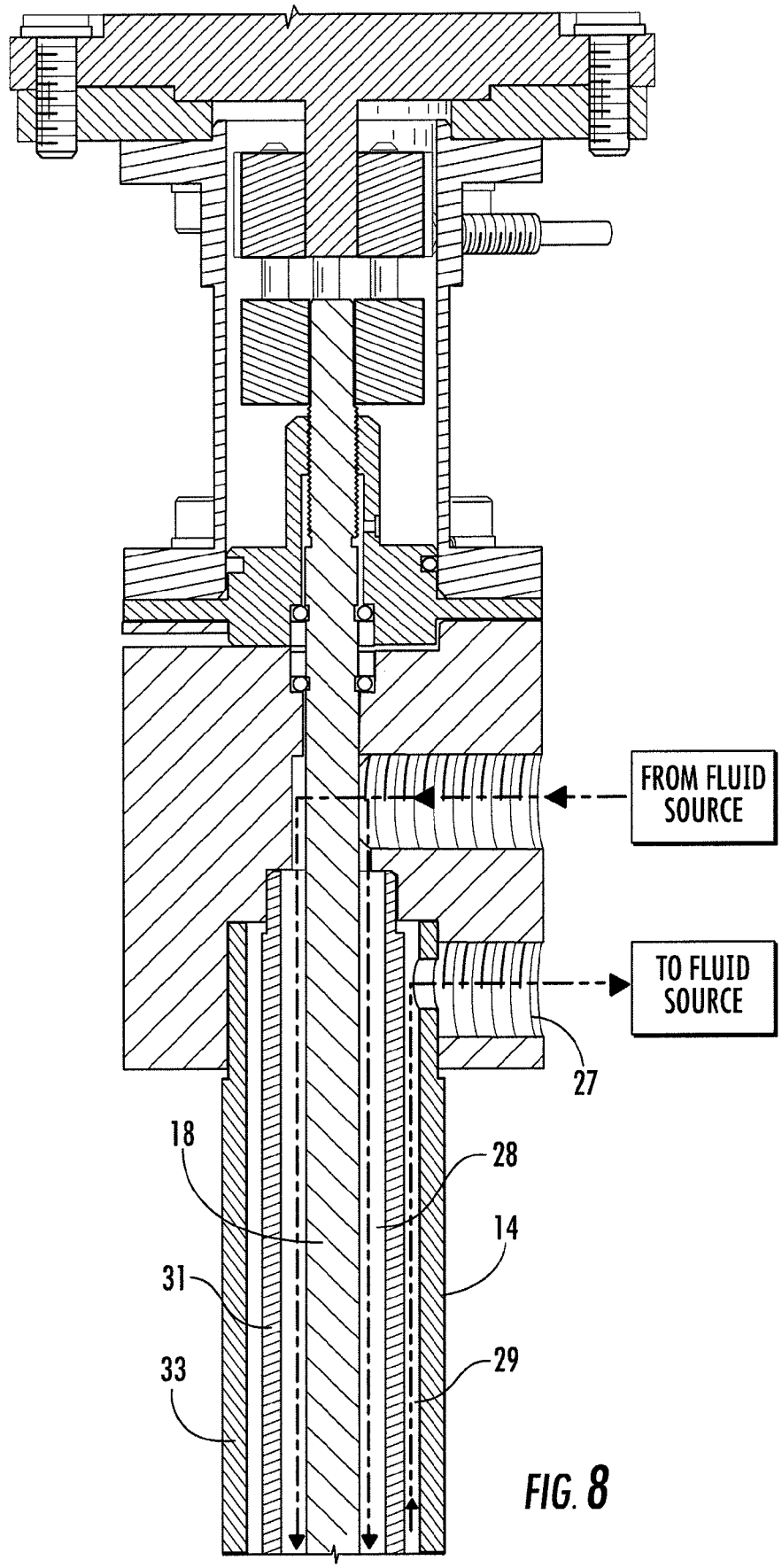
FIGS. 8 and 9 illustrates an alternative embodiment of the invention in which the fluid injector assembly is fluid cooled.
Figure 9:
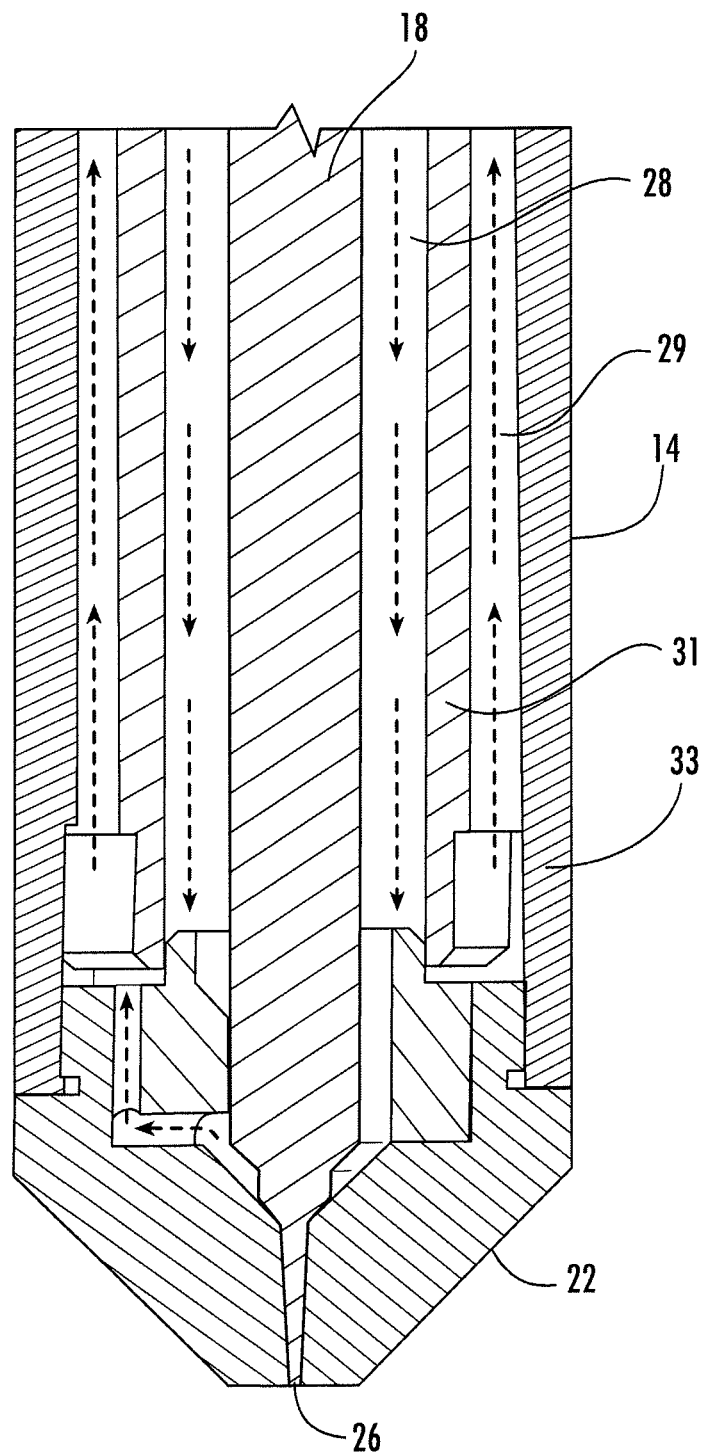

FIGS. 8 and 9 illustrate an alternative embodiment of the fluid injector assembly 10 in which the injection fluid is circulated through the injector body as a cooling fluid. In this embodiment, the injector body includes an inner fluid passageway 28 through which the injection fluid flows from a source of injector fluid and is introduced into the fluid passageway 28 via the fluid inlet 24 towards the fluid outlet 26, and a second fluid passageway 29 from which injection fluid flows from the proximal end of the of the injector body and exits the injector body through a second fluid outlet 27. As noted above, the fluid passageway 28 is defined by the space between the injector needle 18 and an inner wall 31 of the injector body. Second fluid passageway 29 is defined by the space between the inner wall 31 and an outer wall 33 of the injector body. In FIGS. 8 and 9, the dashed arrows represent the flow of the injection fluid as it moves through fluid passageway 28 towards the injector outlet 26, and recirculated through second fluid passageway 29 and is returned to the fluid source via second fluid outlet 27.

Maintaining the injection fluid within a select temperature range may provide several advantages. For example in the case of injection of aqueous urea, controlling the temperature of the injection fluid may help prevent solidification of the urea within the injector body, and in particular in the area towards the fluid outlet of the of the injector body. If allowed to solidify, the urea could prevent proper seating of the tip of the injection needle or could cause the injector needle to seize in either the open or closed position and/or the fluid outlet could become clogged. In addition, the detrimental effects of elevated temperature on the reagent, the moving parts, and the openings of the valve are avoided. For example, by directly cooling the injector body, increased performance may be achieved in comparison with the prior art. Further, increased cooling may help provide for prolonged life of the injector components.

Figure 10:
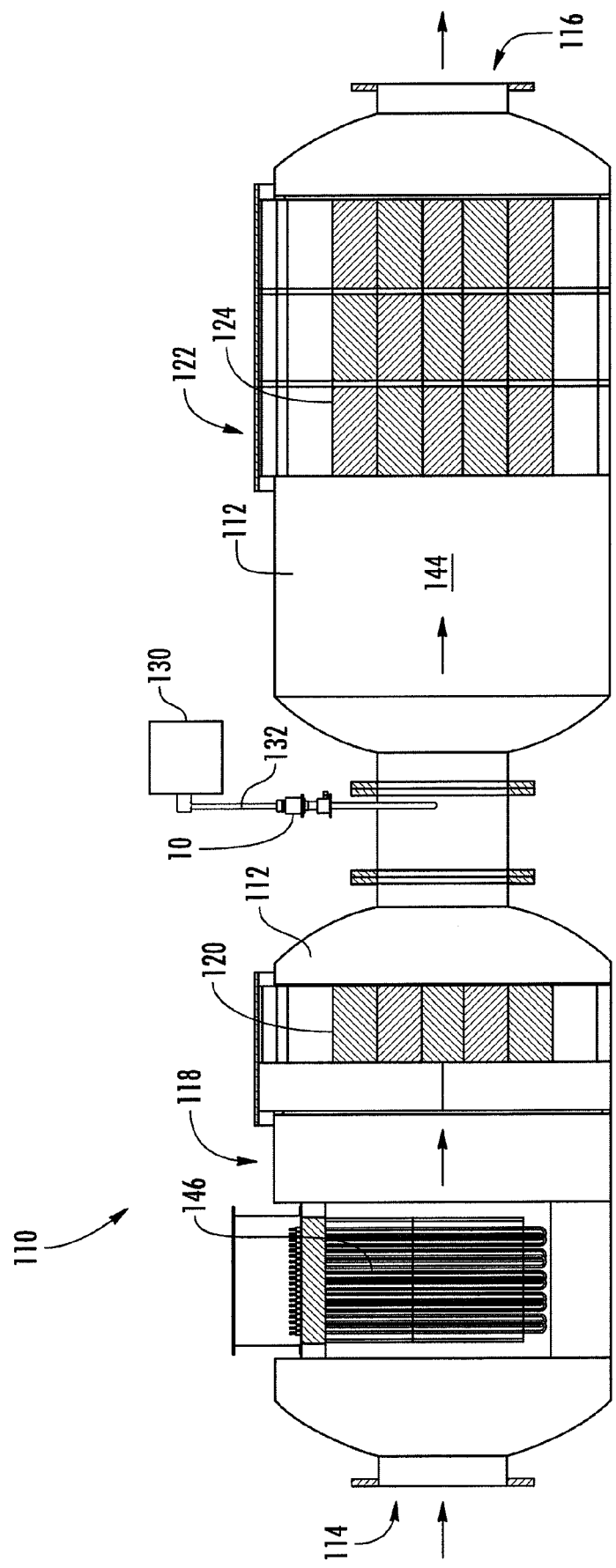
FIG. 10 is a cross-sectional side view on an exhaust emission control system that is in accordance with an embodiment of the present invention.
Figure 11:
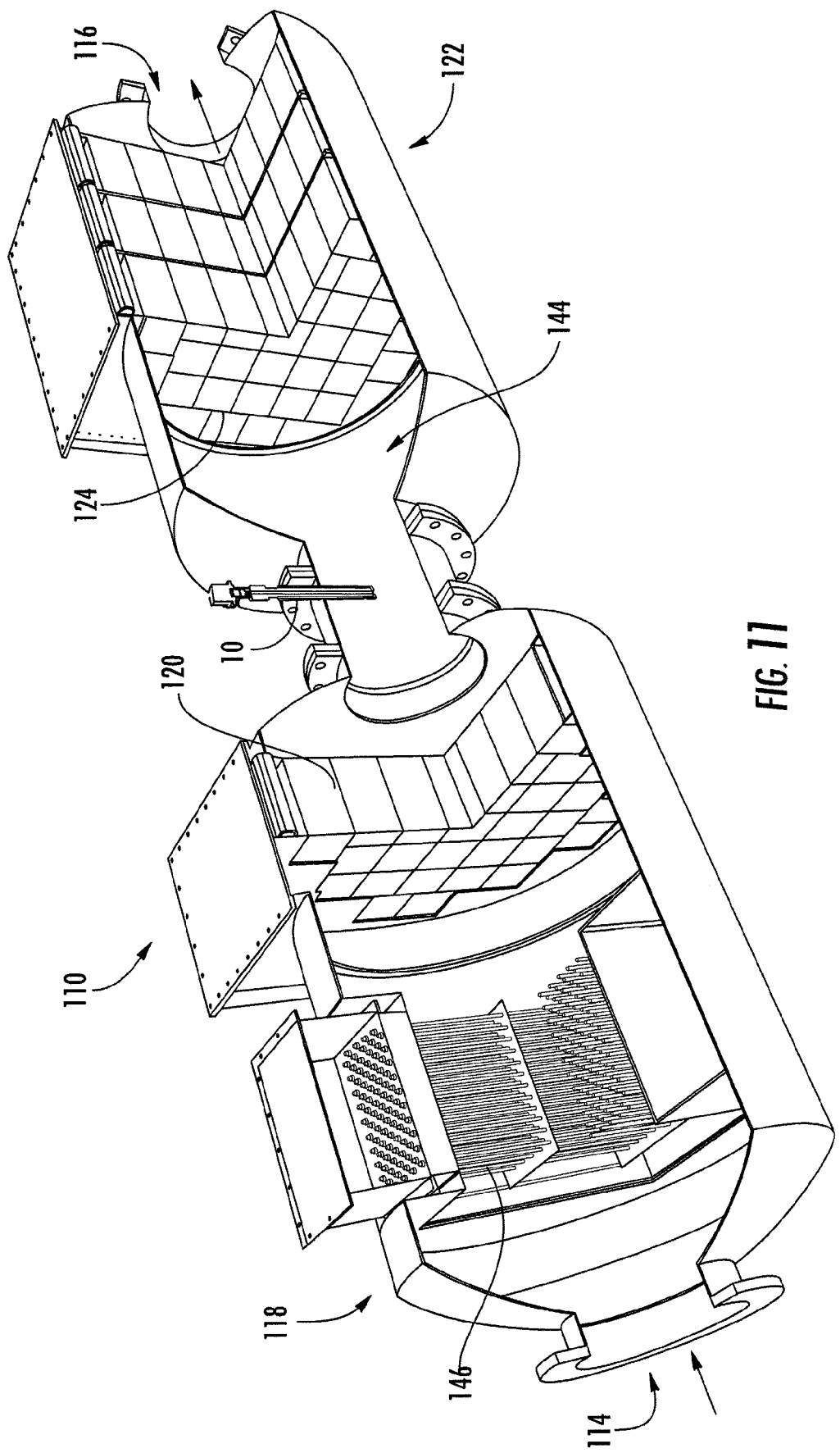
FIG. 11 is a partial perspective view of the exhaust emission control system of FIG. 10.

In one embodiment, the fluid injector assembly is particularly useful in an exhaust emissions control apparatus for the treatment of an exhaust gas stream. In this regard, FIGS. 10 and 11 shows an emissions control apparatus 110. The apparatus includes a housing 112 having an inlet 114 for receiving an exhaust stream from an internal combustion engine and a downstream outlet 116 from which the exhaust stream is discharged. In the illustrated embodiments, the apparatus 10 is shown as having three distinct sections: an upstream section 118 containing a particulate filter 120, a downstream catalyst section 122 containing a catalyst 124, and a urea injector nozzle assembly 10 is disposed therebetween. It should be recognized that in alternative embodiments, the particulate filter, catalyst, and injector nozzle assembly 10 can be incorporated into a single housing structure.

In this embodiment of the present invention, the fluid injector assembly 10 provides a stream of ammonia that is introduced into the exhaust stream. The ammonia stream mixes with the exhaust stream and is carried downstream to the catalyst 124 where the ammonia and NOx react in the catalyst 124 to convert the NOx to nitrogen gas and water. The resulting clean flow is then discharged from outlet 116.

As shown in FIGS. 10 and 11, the catalyst 124 is disposed in the housing 112 towards the downstream outlet 116. The catalyst 124 includes a Selective Catalytic Reduction (SCR) catalyst that is capable of reducing the NOx concentration in the exhaust stream in the presence of ammonia. Examples of possible catalysts that may be used in the present invention include activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures thereof. In addition to the SCR catalyst, the apparatus can include other catalyst, such as an oxidative catalyst.

The fluid injector assembly 10 is disposed in the housing upstream of the catalyst 124, and is configured and arranged to introduce an ammonia stream into the exhaust stream. The fluid injector assembly 10 is in fluid communication with an aqueous urea solution source 130 via supply line 132. A stream of aqueous urea solution is introduced into the fluid injector assembly 10 from urea source 130. Once in the fluid injector assembly 10, the aqueous urea solution is exposed to conditions (e.g., heat) that cause the urea solution to evaporate and hydrolyze to form ammonia. The resulting ammonia stream is then discharged from the outlet of the fluid injector assembly 10 and into the exhaust stream.

In some embodiments, the apparatus 10 may also include a mixing element (not shown) that helps in the uniform distribution of the ammonia into the exhaust stream. The mixing element is typically disposed downstream of the outlet of the fluid injector assembly 10 and comprises a fin device, such as fan, having fins or blades. The exhaust stream flows through the mixing element and the path of the path of the exhaust stream is disturbed creating a turbulent flow of the exhaust stream on downstream side of the mixing device. As a result, the ammonia introduced into the exhaust stream can be more uniformly distributed therein. Downstream of the fluid injector assembly 10 and mixing element, the apparatus includes a mixing zone 144.

As shown in FIGS. 10 and 11, the apparatus may also include a particulate filter 120 that is disposed upstream of the fluid injector assembly 10. Although not illustrated, it should be recognized that the particulate filter 120 can also be disposed downstream of the fluid injector assembly. Particulate filter 120 may be any general type of exhaust filter known in the art, and may include any type of filter media (not shown) known in the art, such as, for example, a ceramic foam, ceramic, sintered metal, metal foam, or silicon carbide, or silicon carbide foam type filter. The particulate filter assists in the removal of particulate matter from the exhaust stream like soot, soluble organic fraction (SOF), and other pollutants produced by engine. The particulate filter may be situated horizontally, vertically, radially, or in any other configuration allowing for proper filtration. In a preferred embodiment, the particulate filter comprises a diesel particulate filter (DPF).

In addition to the particulate filter, the apparatus may also include one or more heating elements for heating the exhaust stream prior to the particulate filter. As shown in FIGS. 10 and 11, a heating element 146 is disposed upstream of the particulate filter 120. Generally, the particulate filter operates most efficiently when the exhaust stream temperature is greater than about 750° F. At temperatures below about 750° F., the particulate filters have a tendency to clog at a faster rate due to the accumulation of particulate matter in the filter. This is particularly true, for diesel particulate filters where the presence of soot in the exhaust stream is higher in comparison to gas powered engines. In addition, an exhaust stream temperature greater than about 450° F. is generally desirable for the decomposition of urea into ammonia. By incorporating a heating element upstream of the particulate filter, it is possible to maintain the exhaust stream temperature at a desired temperature, such as greater than about 450° F., and in particular, greater than about 750° F. Preferably, the heating element is configured and arranged to maintain the temperature of the exhaust stream at about 800° F.

In a preferred embodiment, the heating element includes a plurality of individual heating elements that can be independently operated and controlled. For example, the heating element may include from about 1 to 10 individual heating banks and in particular, from about 2 to 8 heating banks. In one embodiment, the heating element includes 5 heating banks.

Each of the heating banks can be operated independently of each other so that a desired temperature of the exhaust stream can be maintained. For example, if the engine is operating under a low load capacity, the exhaust temperature may be relatively low, such as below the required threshold of 600° F. At this state, the temperature of the exhaust stream may not be sufficient to decompose the urea into ammonia. To compensate for this, the apparatus includes a controller (not shown), such as a programmable logic controller (PLC) that will provide by power to the heating elements to raise the temperature of the exhaust stream to a desired level. In this case, it may be necessary to power all or a majority of the heating banks. However, if the engine is running under a higher load, the temperature of the exhaust stream may already be elevated in comparison to a low load state. In such a case, it may only be necessary to power some of the heating banks to heat the exhaust stream to the desired temperature. In this case, the controller would monitor the exhaust stream temperature and power or depower the heating elements as needed to raise or lower the temperature of the exhaust stream so that it can be maintained at a desired level.

In one embodiment, the heating element is powered by the engine itself. In this case, powering of the heating element heats the exhaust stream by providing a load on the engine which will raise the exhaust stream temperature in addition to the heat provided by the heating element. As a result, the temperature of the exhaust stream can be rapidly increased to temperatures sufficient for the decomposition of urea so that the NOx control can be maintained throughout the operation of the engine. For example, embodiments of the present provide for heating of the exhaust stream to temperatures necessary for NOx control on the order of about 4 minutes following start-up of the engine. Advantageously, the exhaust temperature can be controlled to about 800° F. within approximately 8 minutes of engine startup. As a result, the present invention is able to make the SCR system capable over about 99% of the operational cycle of the engine.

The above described system and apparatus can be used with a variety of different engine applications. In particular, the apparatus and system are particularly useful in combinations with diesel powered generators. For example, in the case of emergency standby generators the ability to achieve normal operating temperatures for urea injection can be problematic. Typically, an emergency standby generator is designed for building steady state electrical requirements plus transient motor starting needs. During weekly maintenance test the generator is off-line and typically no load will exist. In addition, during intermittent power outages, it is highly likely that a generator will run for less than 30 minutes, which is generally an insufficient duration of time for the engine and emission control system to achieve a full steady state temperature that is needed to ensure proper urea injection and cleaning of the particulate filter. The aforementioned factors may contribute to an emission control system in which 1) soot and particulate matter accumulate in the particulate filter; 2) insufficient time to "clean" out the particulate filter; and 3) ineffective NOx reduction in the SCR catalyst due insufficient decomposition of the urea into the required levels of ammonia.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fluid injector assembly comprising:
an injector body having a distal end and a proximal end;
a fluid inlet disposed towards the proximal end of the injector body;
a fluid outlet disposed towards the distal end of the injector body;
a fluid pathway extending between the inlet and the outlet;
a needle rotatably disposed at least partially in the injector body and being moveable between an open and closed position, the needle having a tip at a proximal end thereof, the tip being configured to sealably close the fluid outlet;
a first threaded region that cooperates with a corresponding threaded region on the needle; and
first and second cooperating coupling members arranged axially of the needle, the first coupling member being attached to a motor, and the second coupling member being attached to a distal end of needle, wherein at least one of the coupling members includes at least one connecting member that is slidingly inserted into a corresponding cavity on the other coupling member,
wherein rotation of the first coupling member by the motor also rotates the second coupling member and the needle, which in turn causes the threaded region of the needle to be threaded through the first threaded region so that the needle is rotably driven between the opened and closed positions, and wherein driving of the needle causes the at least one connecting member to slide in or out of the corresponding cavity.

2. The fluid injector assembly of claim 1, wherein the first and second coupling members each comprise a plurality of connecting members and corresponding cavities.

3. The fluid injector assembly of claim 1, wherein the first and second coupling members each comprise at least three connecting members and at least three cavities that each correspond to an individual connecting member on the opposite coupling member.

4. The fluid injector assembly of claim 1, wherein the first threaded region is arranged in a collar disposed adjacent to the distal end of the injector body.

5. The fluid injector assembly of claim 1, wherein the first threaded region is arranged in the injector body.

6. The fluid injector assembly of claim 1, further comprising a cooling jacket circumferentially surrounding said injector body, the cooling jacket being configured to receive and recirculate a cooling fluid therein to maintain a fluid within the fluid injector assembly at a desired temperature.

7. The fluid injector assembly of claim 6, wherein the cooling fluid comprises the fluid to be injected by fluid injector assembly.

8. The fluid injector assembly of claim 6, further comprising a fluid source that is in fluid communication with the fluid inlet and the cooling jacket.

9. The fluid injector assembly of claim 6, further comprising a center fitment disposed towards the proximal end of the injector body, the center fitment being configured and arranged to align the injector needle with the fluid outlet.

10. The fluid injector assembly of claim 1, wherein the proximal end of the injector body includes at least one conically-shaped surface that is configured and arranged to cooperate with a corresponding conically shaped surface on the proximal end of the injector needle.

11. The fluid injector assembly of claim 1, wherein the fluid pathway comprises a longitudinally extending annular shaped passageway.

12. An exhaust emission control system for an engine comprising:
- a housing having inlet for receiving an exhaust stream from the engine and an outlet for discharging the exhaust stream;
- a urea source;
- the fluid injector assembly of claim 1 in fluid communication with said urea source, the fluid injection system being configured to discharge a stream of urea into the exhaust stream; and
- a catalyst disposed downstream of the fluid injector assembly.

13. The exhaust emission control system of claim 12, wherein the catalyst is a selective catalytic reduction converter.

14. The exhaust emission control system of claim 12, wherein the engine is a diesel engine.

15. The exhaust emission control system of claim 12, further comprising a particulate filter disposed upstream or downstream of the fluid injector assembly.

16. The exhaust emission control system of claim 15, wherein in one or more heating elements are disposed upstream of the particulate filter.

17. The exhaust emission control system of claim 16, wherein the system includes at least two heating elements that are controlled independently of each other such that the an exhaust stream temperature in the range of about 450 to 900° F. can be maintained.

* * * * *

UNITED STATES PATENT AND TRADEMARK OFFICE
CERTIFICATE OF CORRECTION

| | | |
|---|---|---|
| PATENT NO. | : 8,549,840 B2 | Page 1 of 1 |
| APPLICATION NO. | : 12/944994 | |
| DATED | : October 8, 2013 | |
| INVENTOR(S) | : van Niekerk | |

It is certified that error appears in the above-identified patent and that said Letters Patent is hereby corrected as shown below:

<u>Title page,</u>
Item (57) ABSTRACT,
Lines 3 and 4, "a fluid inlet disposed towards the proximal end, a fluid outlet disposed towards the distal end" should read --a fluid inlet disposed towards the distal end, a fluid outlet disposed towards the proximal end--.

<u>In the Specification,</u>
<u>Column 1,</u>
Lines 60, 61 and 62, "a fluid inlet disposed towards the proximal end of the injector body, a fluid outlet disposed towards the distal end of the injector body" should read --a fluid inlet disposed towards the distal end of the injector body, a fluid outlet disposed towards the proximal end of the injector body--.

<u>In the Claims,</u>
<u>Column 10,</u>
Lines 8, 9, 10 and 11, "a fluid inlet disposed towards the proximal end of the injector body; a fluid outlet disposed towards the distal end of the injector body" should read --a fluid inlet disposed towards the distal end of the injector body; a fluid outlet disposed towards the proximal end of the injector body--.

Signed and Sealed this
Third Day of June, 2014

Michelle K. Lee
*Deputy Director of the United States Patent and Trademark Office*